US011323633B2

(12) United States Patent
Miller, Jr. et al.

(10) Patent No.: US 11,323,633 B2
(45) Date of Patent: May 3, 2022

(54) AUTOMATED CREATION OF A FREEFORM MASK FOR AUTOMOTIVE CAMERAS

(71) Applicant: Bendix Commercial Vehicle Systems, LLC, Elyria, OH (US)

(72) Inventors: Thomas S. Miller, Jr., Lagrange, OH (US); Gabriel Ruprecht, Ludwigsburg (DE)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 16/458,456

(22) Filed: Jul. 1, 2019

(65) Prior Publication Data
US 2021/0001773 A1    Jan. 7, 2021

(51) Int. Cl.
*H04N 5/262*  (2006.01)
*G06T 7/80*   (2017.01)
*G06T 5/00*   (2006.01)

(52) U.S. Cl.
CPC ........... *H04N 5/2621* (2013.01); *G06T 5/002* (2013.01); *G06T 7/80* (2017.01); *B60R 2300/303* (2013.01); *B60R 2300/304* (2013.01); *B60R 2300/402* (2013.01); *G06T 2207/30252* (2013.01)

(58) Field of Classification Search
CPC ............... B60R 1/00; B60R 2300/303; B60R 2300/304; B60R 2300/402; G06T 5/002; G06T 7/80; G06T 2207/30252; H04N 5/2621
See application file for complete search history.

(56) References Cited

U.S. PATENT DOCUMENTS

| | | |
|---|---|---|
| 5,689,249 A | 11/1997 | Sakamoto et al. |
| 6,727,938 B1 | 4/2004 | Randall |
| 8,005,266 B2 | 8/2011 | Saka et al. |
| 8,115,810 B2 | 2/2012 | Yoneji |
| 8,194,127 B2 | 6/2012 | Kang et al. |
| 8,400,329 B2 | 3/2013 | Kumagami |
| 8,670,034 B2 | 3/2014 | Hattori et al. |
| 9,969,331 B2 | 5/2018 | Huebner et al. |
| 10,198,621 B2 | 2/2019 | Takeda et al. |
| 10,217,195 B1* | 2/2019 | Agrawal ............... G06T 7/11 |
| 2012/0287287 A1* | 11/2012 | Grossmann ......... H04N 17/002 348/181 |

(Continued)

OTHER PUBLICATIONS

Tawari et al., "Attention Estimation by Simultaneous Analysis of Viewer and View," IEEE Conference on Intelligent Transportation Systems, Oct. 2014 (seven (7) pages).

*Primary Examiner* — Joseph W Becker
(74) *Attorney, Agent, or Firm* — Crowell & Moring LLP

(57) ABSTRACT

A system, method, and non-transitory computer-readable medium are provided for creating a freeform field of view mask for a camera in a vehicle to increase the field of view of the camera during operation of the vehicle. The camera captures an image of a portion of the vehicle in front of a calibration screen. A processor includes logic that applies a blurring filter to the captured image to create a blurred image, determines a freeform boundary of a field of view of the camera in the blurred image, creates a field of view mask based on the freeform boundary; and applies the field of view mask to the camera for maximizing the field of view of the camera during operation of the vehicle.

26 Claims, 16 Drawing Sheets

(56) References Cited

U.S. PATENT DOCUMENTS

| | | | |
|---|---|---|---|
| 2016/0154926 A1* | 6/2016 | Szigeti | G06T 7/32 |
| | | | 703/8 |
| 2018/0025508 A1 | 1/2018 | Lee | |
| 2018/0033151 A1 | 2/2018 | Matsumoto et al. | |
| 2018/0070023 A1* | 3/2018 | Oh | G06T 11/00 |
| 2019/0318509 A1* | 10/2019 | Budagavi | G06T 7/90 |
| 2020/0160560 A1* | 5/2020 | Besley | G06T 7/38 |

* cited by examiner

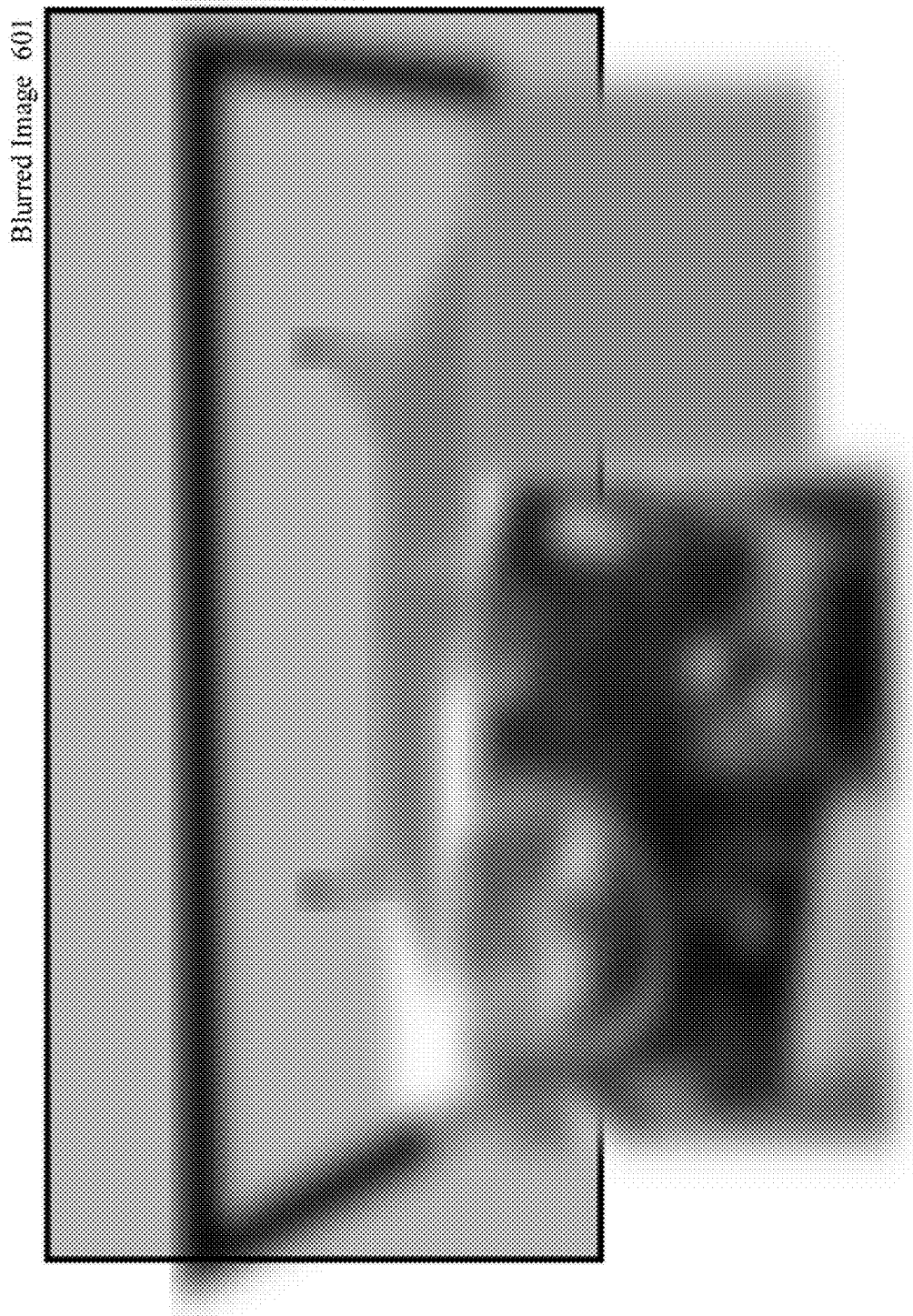

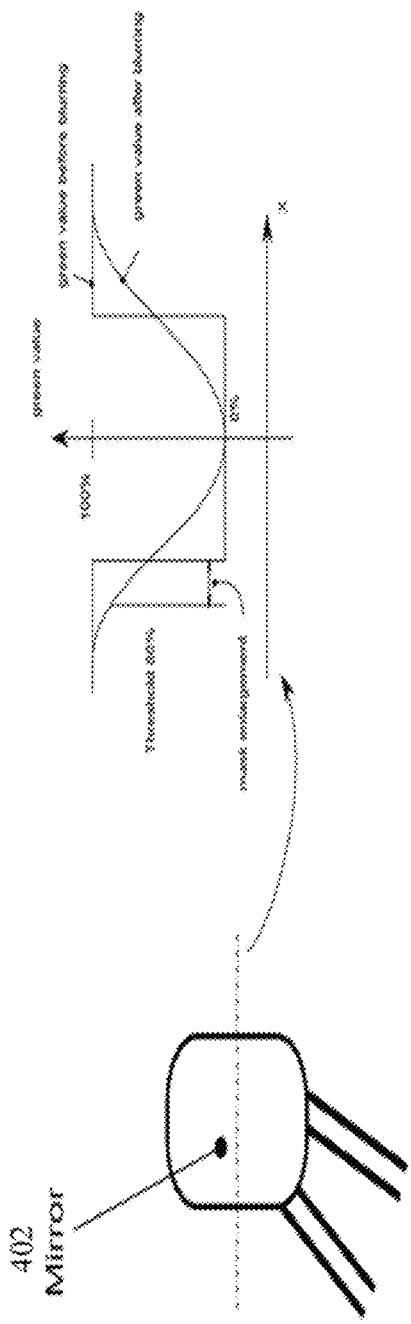
FIG. 7A
FIG. 7B
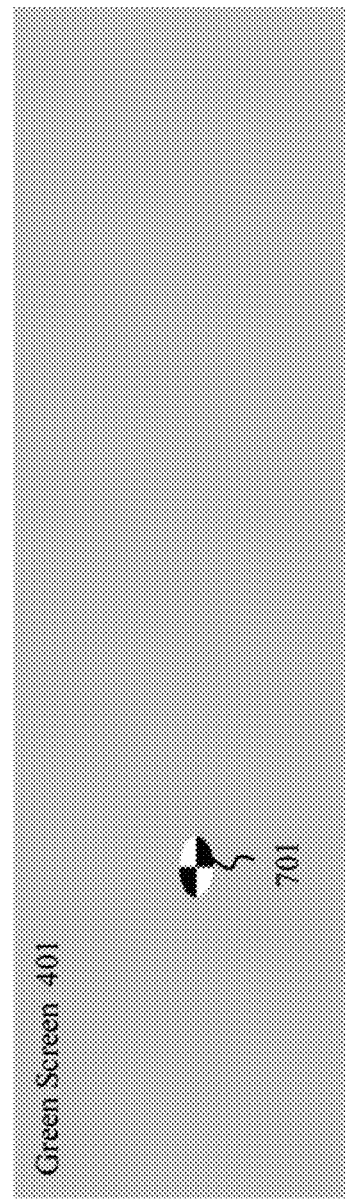
FIG. 7C

AUTOMATED CREATION OF A FREEFORM MASK FOR AUTOMOTIVE CAMERAS

BACKGROUND AND SUMMARY OF THE INVENTION

The present invention relates to a system, method and non-transitory computer-readable medium for calibrating a camera in a vehicle. More specifically, the present invention creates a freeform field of view mask for the camera to increase its field of view during operation of the vehicle.

Conventional camera calibration systems crop an excessive amount of the image capturing area. As illustrated in FIG. 5, for example, a typical conventional camera calibration system uses a rectangular cropping area to crop everything in the image that is fixed to the vehicle. Alternatively, the cropped area may include the area between the vehicle mirrors down to the bonnet. Although the simple vertical cropping performed by conventional systems removes all possible obstructions in the field of view of the camera, these systems also remove more of the image than is desired.

The present invention provides a system, method and computer-readable medium that provide an improvement over conventional systems by providing a greater field of view for the vehicle camera, which provides for safer operation of the vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 illustrates a blurred image in accordance with an embodiment of the present invention.

FIGS. 7A-7C illustrate a blurring technique according to an embodiment of the present invention.

DETAILED DESCRIPTION OF THE DRAWINGS

Figure 1:
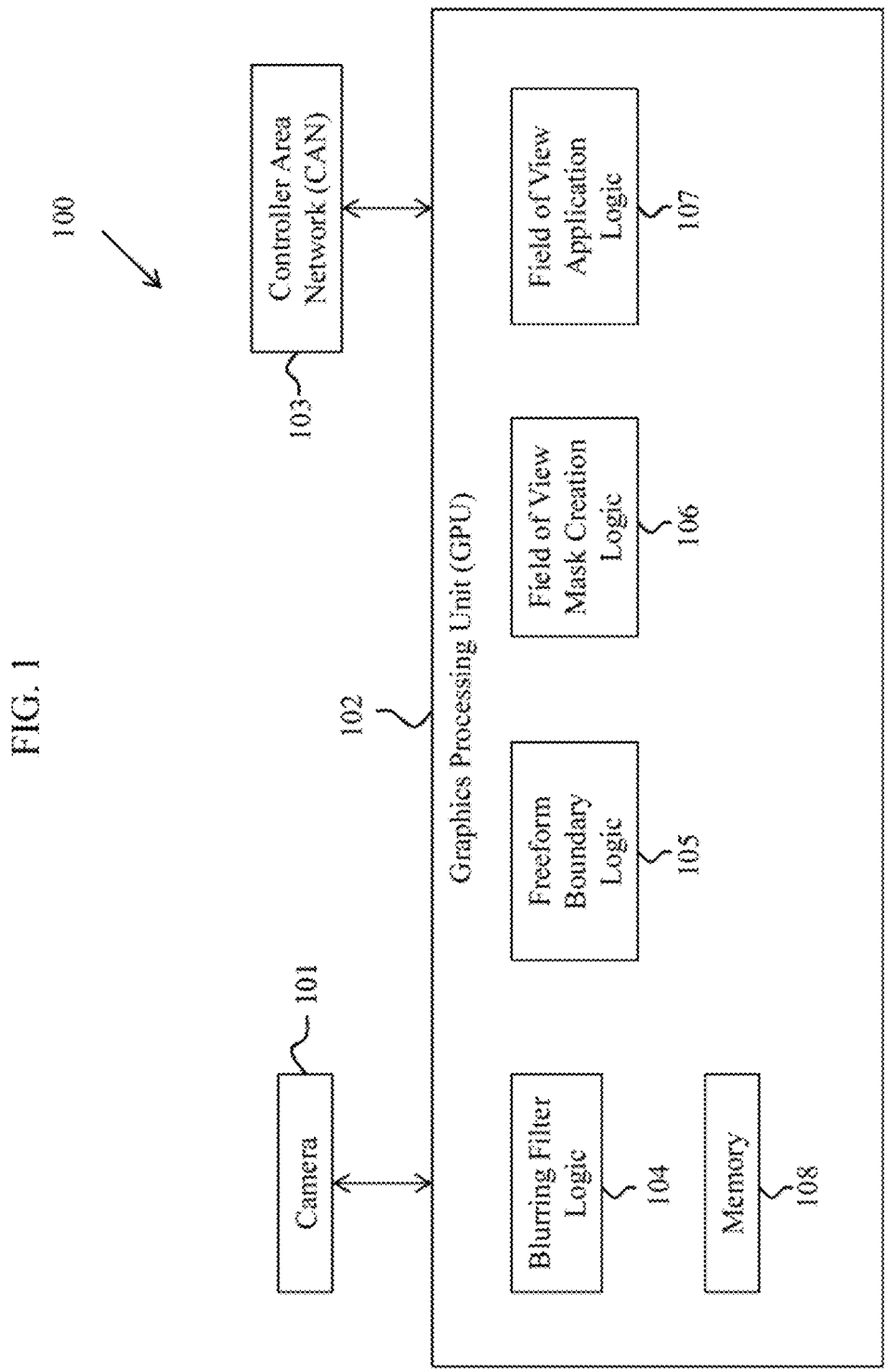
FIG. 1 illustrates a schematic block diagram of a system according to an exemplary embodiment of the present invention.

FIG. 1 illustrates a schematic block diagram of a system according to an exemplary embodiment of the present invention. As illustrated in FIG. 1, an exemplary embodiment of the system 100 includes a camera 101, a processor (e.g., graphics processing unit (GPU)) 102, and a controller area network (CAN) 103. Although only one camera is illustrated, the system can include a plurality of cameras, each of which is calibrated as described below. The GPU 102 may include, for example, blurring filter logic 104 configured to perform blurring filtering of images, freeform boundary logic 105 configured to perform a freeform boundary determination, field of view mask creation logic 106 configured to perform creation of a field of view mask for the camera, field of view application logic 107 configured to apply the field of view to the camera, and a memory 108 configured to store data related to the camera calibration and other data. The memory 108 can be any kind of non-transitory memory, such as random access memory (RAM), read-only memory (ROM), flash memory, a hard disk, a CD, a DVD, and cloud storage. The GPU can be any type of processor, such as a field programmable gate array (FPGA), application specific integrated circuit (ASIC), central processing unit (CPU) and/or a microprocessor programmed to perform the functions of the camera calibration as described below. The CAN 103 connects to the GPU 102 and other vehicle systems.

Figure 2:
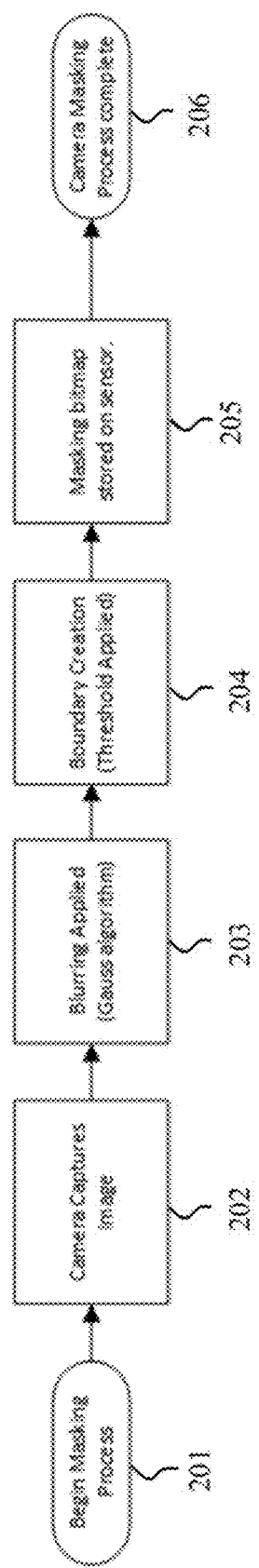
FIG. 2 illustrates a method according to an exemplary embodiment of the invention, in which a single calibration screen is implemented.
Figure 4:
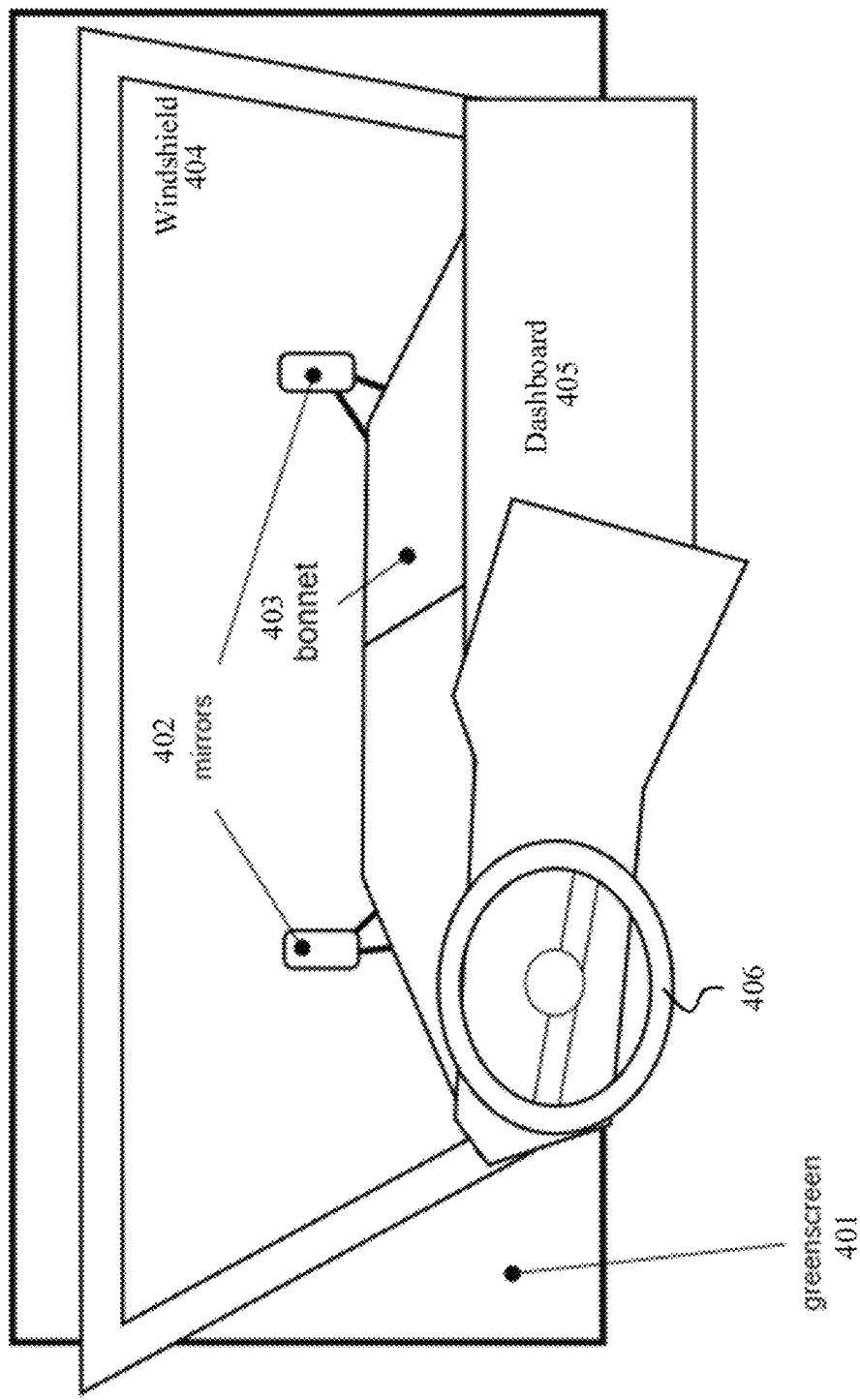
FIG. 4 illustrates a drawing representing an image taken by a camera in a vehicle with a calibration screen in a background thereof.

FIG. 2 illustrates a method according to an exemplary embodiment of the invention, in which a single calibration screen is implemented. In step 201, the masking process begins. This step may include, for example, setting up the environment in which the vehicle is located for the camera calibration, such as installing a calibration screen (e.g., green screen), moving the vehicle into position for the calibration, and the like. The vehicle can be an automobile, a commercial vehicle such as a tractor-trailer or forklift, an airplane, a drone, a train, etc. In step 202, the camera 101 installed in the vehicle captures one or more images. For example, the camera 101 can be located in a cab of the vehicle for obtaining an image through the windshield of the vehicle. As illustrated in FIG. 4, the image may capture the calibration screen (e.g., green screen) 401 in front of the vehicle, mirrors 402 located at the front of the vehicle, a bonnet (hood) 403, a windshield 404, a dashboard 405, and a steering wheel 406. The calibration screen 401 can be a green screen, but it may alternatively be a monochromatic screen of another color or a screen with a calibration pattern.

After the image is captured, the image processing begins by applying a blurring filter (e.g., a Gaussian blurring filter, directional blurring, or the like) to the image in step 203. The blurring filter softens the edges, provides a buffer around components in the image, and hides impurities in the image. FIG. 6 illustrates a blurred image 601 in accordance with a Gaussian blurring filter, wherein the calibration screen 401 is illustrated in the background.

FIGS. 7A-7C illustrate a Gaussian blurring process for a mirror 402 in the front of the vehicle according to an embodiment of the present invention. The green value of the green screen 401 for the mirror 402 appears as a rectangular shape having either a 100% green value or a 0% green value before the blurring process. After one stage of Gaussian blurring in step 203, the green value of the mirror is represented with smooth changes in green value which gradually changes from 100% to 0% and back to 100% for the mirror 402 from left to right in the drawing.

Figure 8:
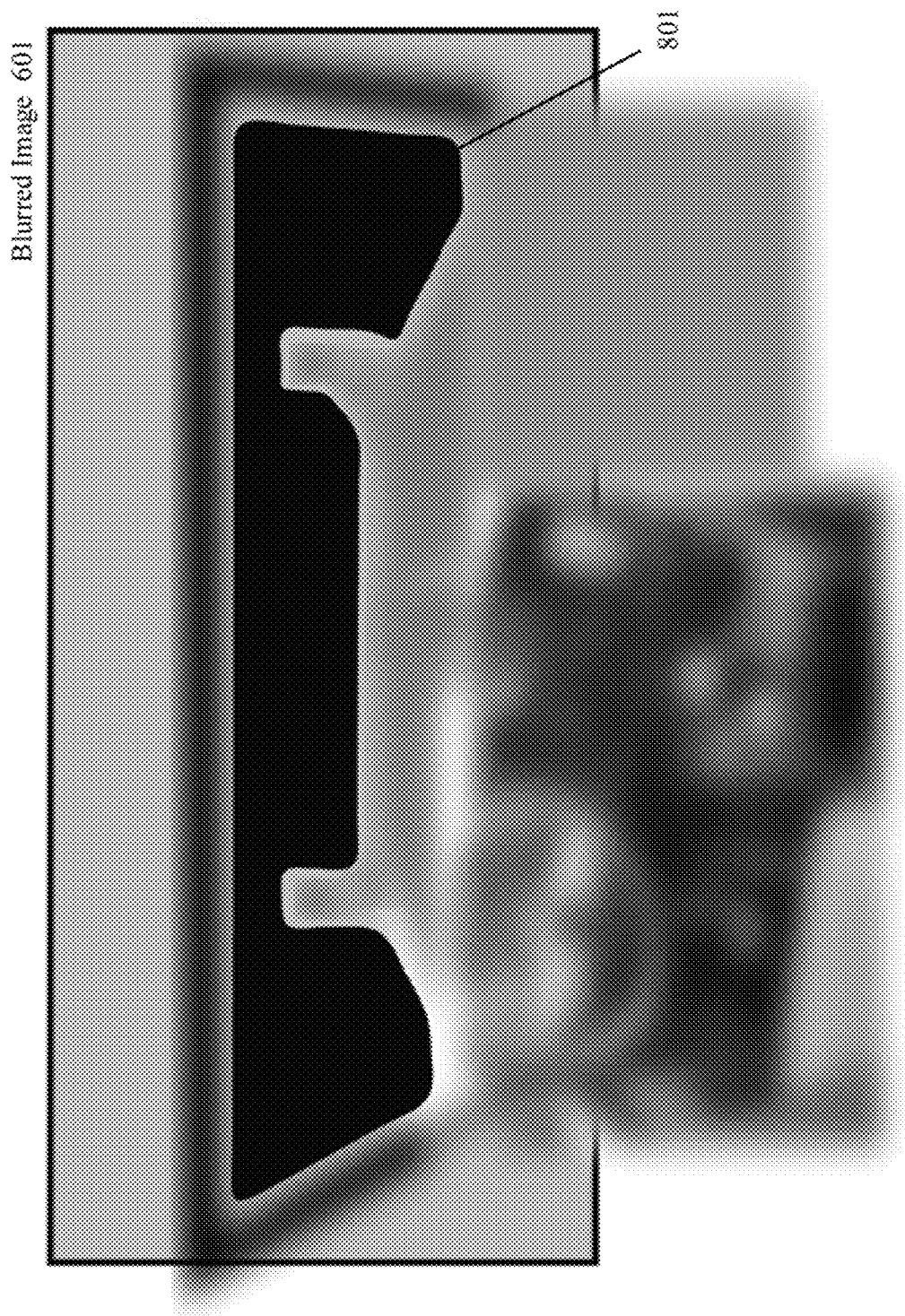
FIG. 8 illustrates a freeform boundary of a field of view of the camera in the blurred image according to an embodiment of the present invention.

In step 204, a freeform boundary for a field of view of the camera is created. As illustrated in FIG. 8, the freeform boundary 801 of the field of view of the camera in the blurred image is created that follows the contour of the windshield 404 and the mirrors 402. The freeform boundary can be created by applying a threshold to the image data. By comparing the image data to the threshold, the green screen areas and the areas of the vehicle are distinguished from each other and the freeform boundary is created.

As illustrated in FIG. 7B, the threshold for recognition of the mirror can be set at 80% (e.g., green≥80% of maximum value) or any other desired value. The higher the threshold is set, the larger the mask is, which results in a bigger aura around the objects in the image. According to a preferred embodiment of the invention, the optimal green screen value is between 60% and 80%. Everything in the image below this threshold is set to black and cropped out of the image. The mask is set according to the threshold, such that every area determined to be green is set to 1 and every other area is set to 0. Alternatively, the ratio of a target color to one of the residual colors (e.g., green≥2×(red+blue) can be set as the threshold. Also, as illustrated in FIG. 7C, the green screen 401 can have one or more calibration targets 702 integrated into it. The calibration targets can be used for calibrating contrast, sensitivity, orientation, etc. Also, the targets can be used to adjust for lateral and vertical offset, as well as rotation of the camera. The camera needs to know the effective forward driving direction to operate properly. If the camera is installed correctly, this is not a problem. But if the camera is installed incorrectly, the targets will tell the camera where the forward direction is.

Figure 9:
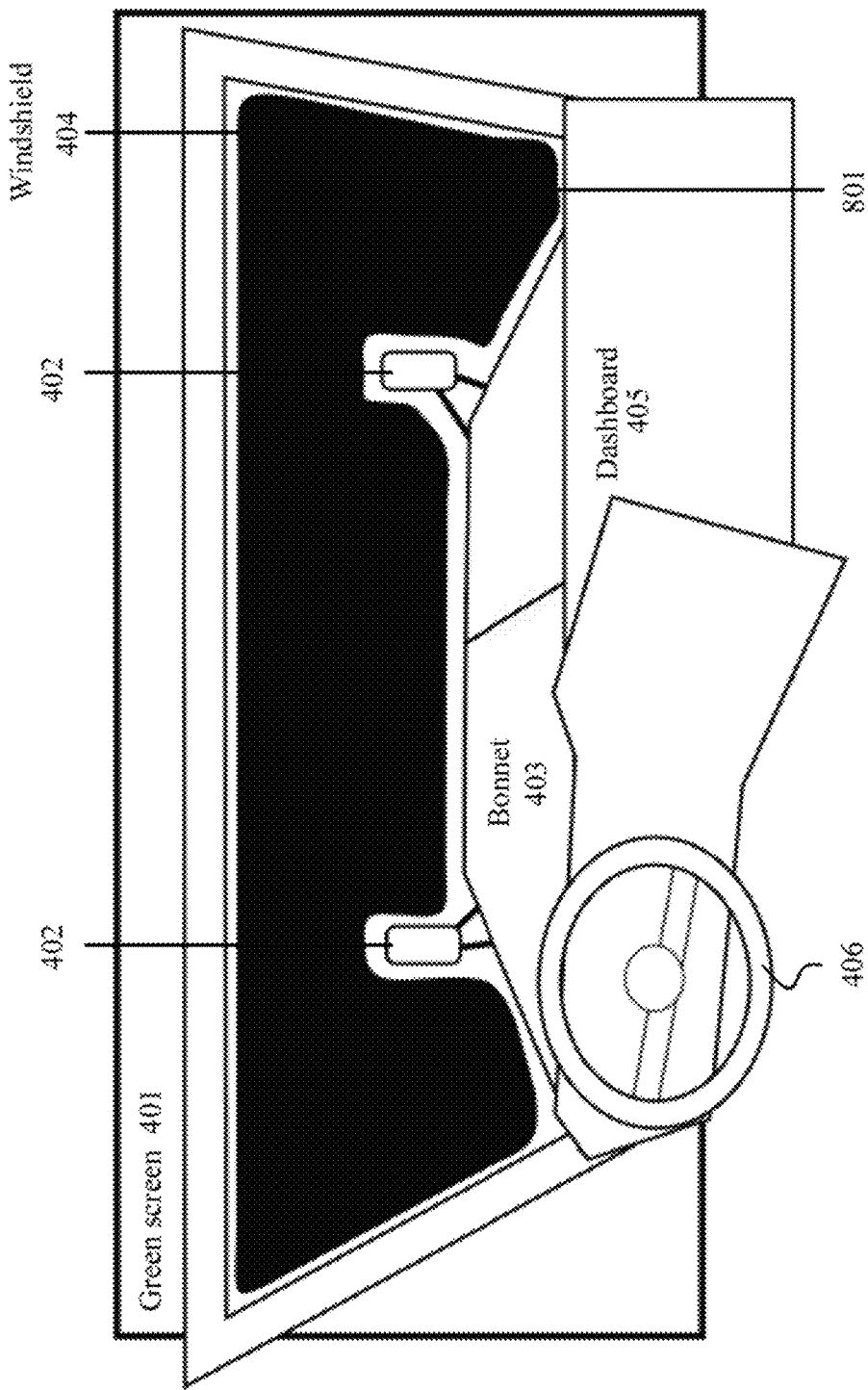
FIG. 9 illustrates a drawing representing a freeform boundary of a field of view of the camera according to an embodiment of the present invention.

FIG. 9 illustrates a drawing representing the freeform boundary according to an embodiment of the present invention. As shown in this drawing, the freeform boundary 801 maximizes the field of view through the windshield 404, which results in better object detection by the camera during operation of the vehicle. Thus, in step 204, the field of view mask is created based on the freeform boundary. Steps 203 and 204 can be repeated any desired number of times to increase the image area and the mask and improve the hiding of impurities and smoothing of edges. In step 205, the field of view mask is stored in the camera for controlling the field of view for images taken by the camera. The camera masking process is complete in step 206, at which time the vehicle can be moved from the calibration environment and prepared for its normal operation.

Figure 5:
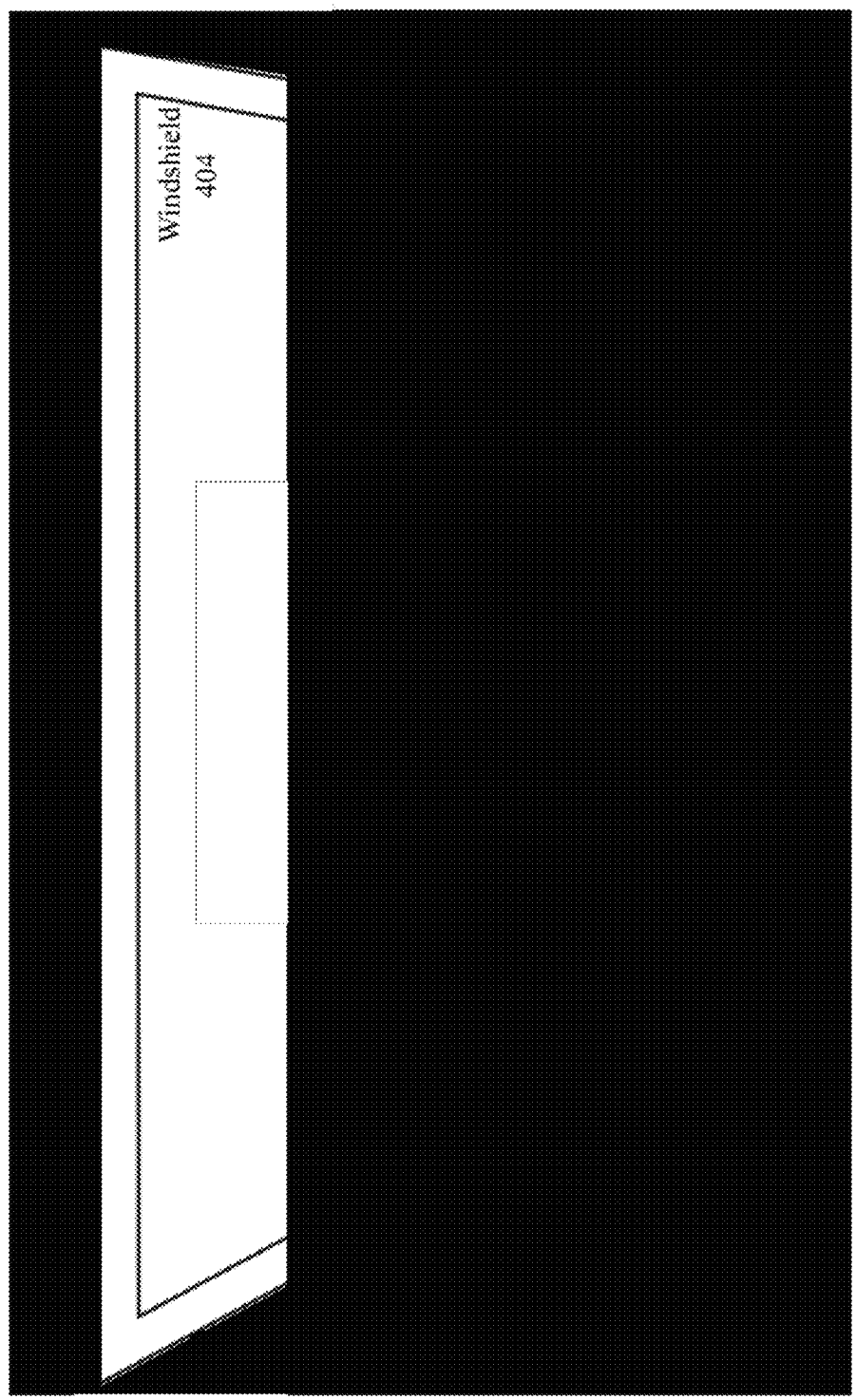
FIG. 5 illustrates a cropped image from a camera in a vehicle according to a conventional field of view mask for the camera.
Figure 10:
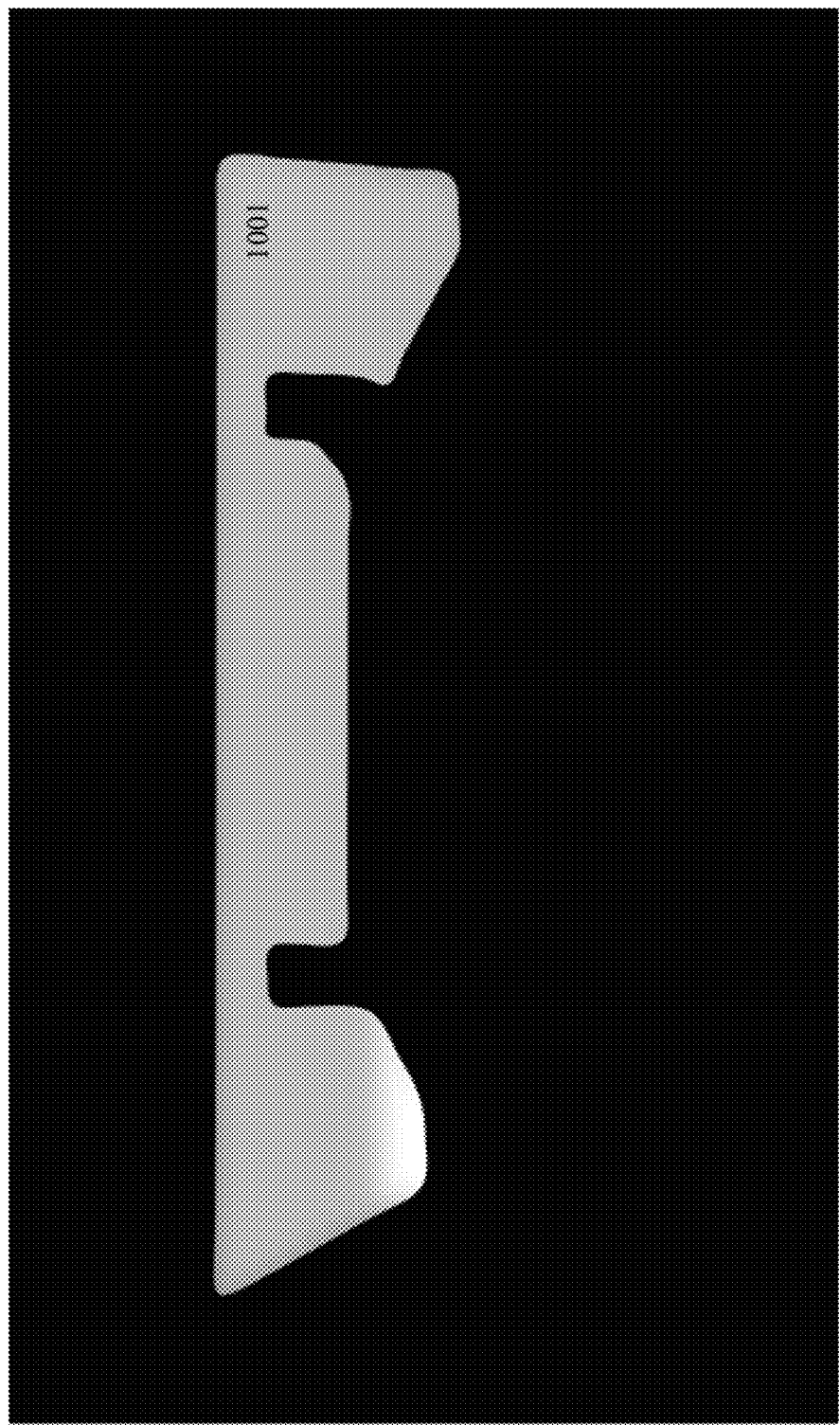
FIG. 10 illustrates a field of view of the camera with a calibration screen according to an embodiment of the present invention.
Figure 11:
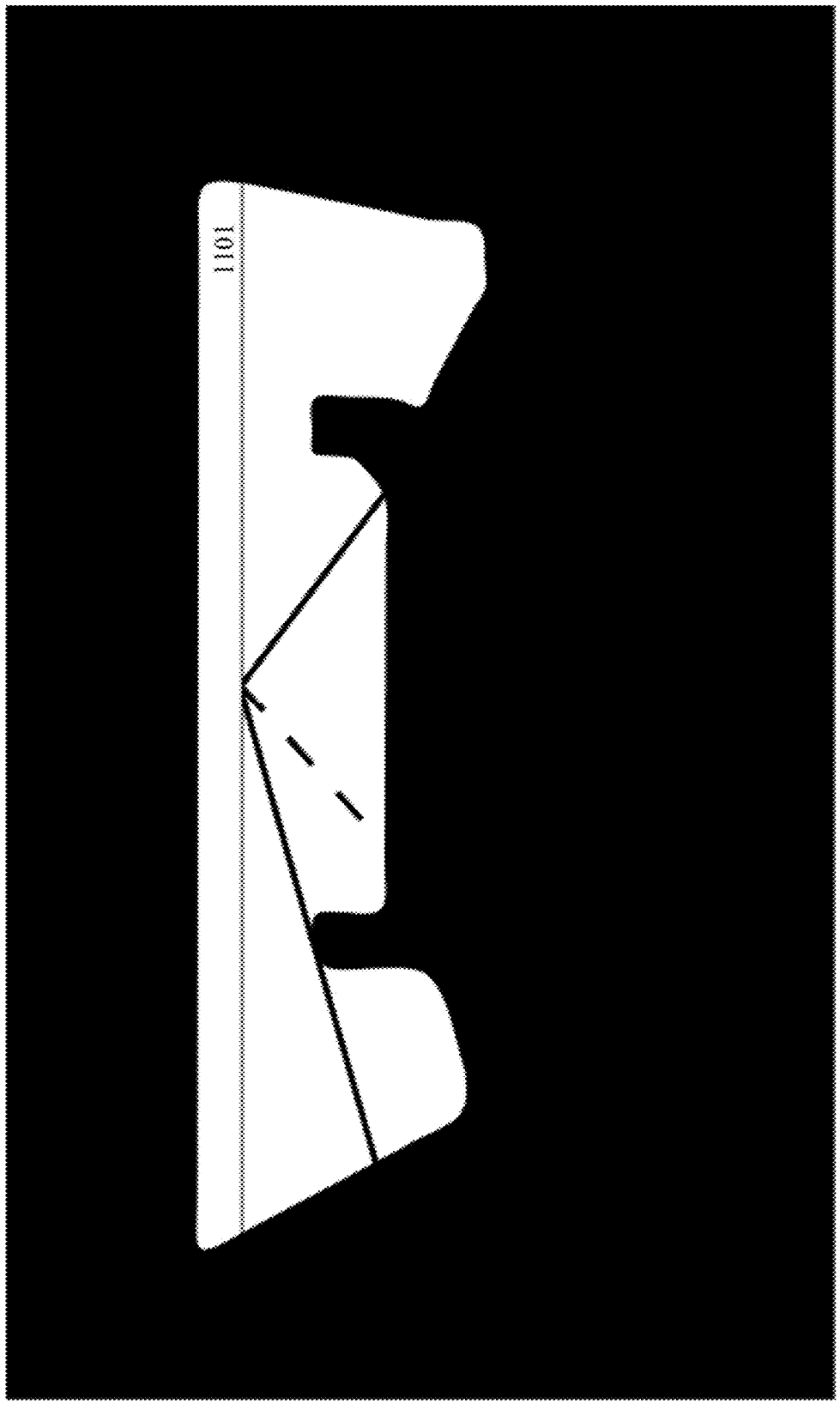
FIG. 11 illustrates a drawing representing a field of view of the camera in a vehicle in which a field of view mask determined according to an embodiment of the present invention is applied to the camera.
Figure 12:
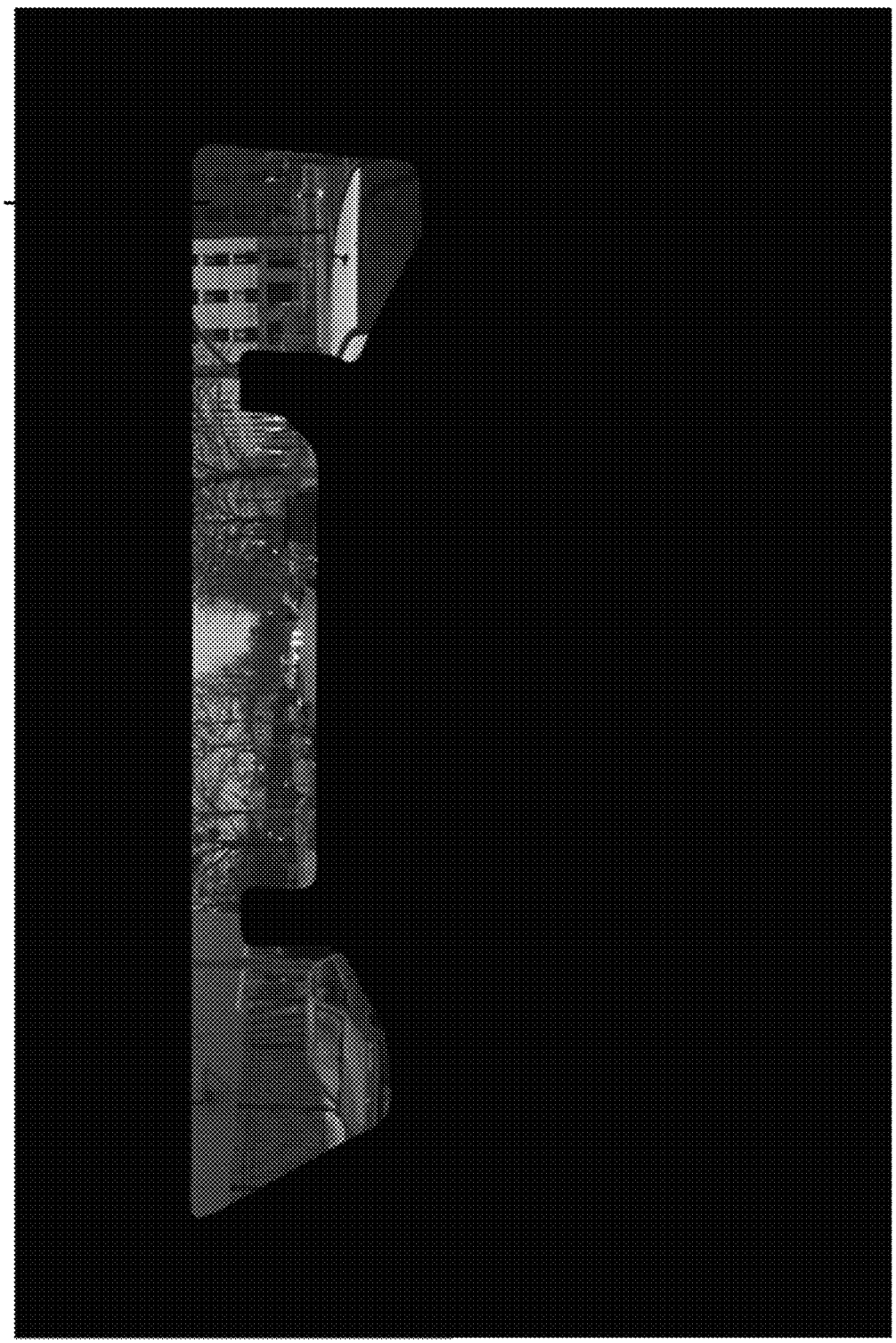
FIG. 12 illustrates an image taken by a camera in a vehicle in which a field of view mask determined according to an embodiment of the present invention is applied to the camera.

FIG. 10 illustrates a field of view 1001 of the camera 101 with a green screen in front of the vehicle according to the above-described embodiment of the present invention. FIG. 11 illustrates a drawing representing a field of view 1101 observed by the camera 101 in a vehicle on a road in which a field of view mask determined according to the above-described embodiment of the present invention is applied to the camera 101. FIG. 12 illustrates an actual image 1201 taken by a camera in a vehicle, during normal operation after camera calibration, in which a field of view mask has been applied to the camera according to an embodiment of the present invention. As shown in FIGS. 10-12, the amount of the image cropped out by the camera is significantly reduced as compared to the cropping of conventional systems as shown in FIG. 5.

Figure 3:
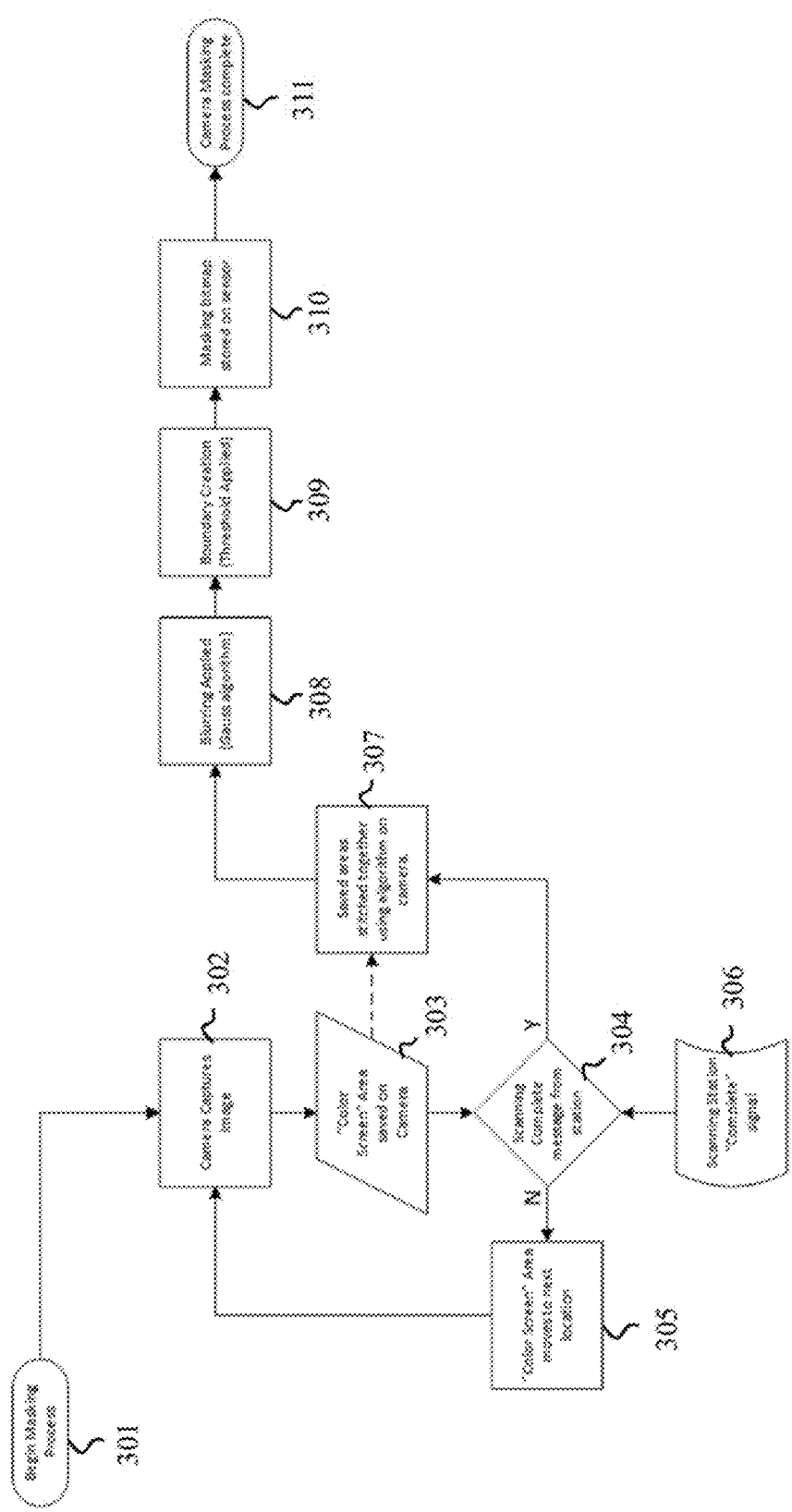
FIG. 3 illustrates a method according to an exemplary embodiment of the present invention, in which a plurality of calibration screens is implemented.

FIG. 3 illustrates a method according to another exemplary embodiment of the present invention, in which a plurality of calibration screens is used instead of one calibration screen. In step 301, like step 201 of FIG. 2, the masking process begins, which may include setting up a calibration screen (e.g., green screen), positioning a vehicle for performing calibration of a camera installed in or on the vehicle. In step 302, the camera captures an image in front of the calibration screen. In step 303, a color screen area on the camera is saved for a first location of the calibration screen.

In step 304, it is determined whether the scanning of the image area in front of the camera is completed based on whether a scanning complete message has been received. If the scanning of the image area is not completed, then in step 305, the calibration screen area moves to the next location so that the next image can be captured in step 302. After all of the areas making up the image area have been scanned, the scanning complete signal is sent to the processor in step 306 to indicate that the scanning of the entire area of image capture of the camera has been completed. The scanning complete signal can be received from a user interface via input by a user of the calibration system. Alternatively, the scanning complete signal can be automatically generated by the processor when the processor determines that an end of the area to be scanned has been reached.

After the processor determines in step 304 that the entire image has been captured, the saved areas of the image are stitched together in step 307 according to an image-stitching algorithm stored in the camera 101 to produce one complete image. Alternatively, after the first image is captured, when each subsequent image is captured, the newly captured image may be stitched together with previously captured images before the scanning is complete, i.e., the images are stitched together one at a time. In step 308, like step 203, a blurring filter is applied to the image. A freeform boundary is created in step 309 by applying a threshold as described above in relation to FIG. 2, and the field of view mask is created based on the freeform boundary. Alternatively, step 308 can occur between steps 302 and 303 instead of between steps 307 and 309, thereby applying the blurring filter to each image prior to the stitching together of the images. In step 310, the field of view mask is stored in the camera for controlling the field of view for images taken by the camera. The calibration process ends in step 311, where the vehicle may be moved from the calibration environment into its normal operation, where images can be captured by the camera in the vehicle based on the field of view mask applied to the camera as described above.

The field of view mask can be loaded from the memory into an electronic computing unit (programmable and/or non-programmable) and there via a logical operation is processed with the camera image. This can be done by using the alpha channel, a multiplication or an addition (e.g., minus the mask as a white value image). Alternatively, the field of view mask can be applied to the image using a 2-D shutter hardware located immediately in front of the image plane (usually CCD/CMOS chip).

Figure 13:
FIG. 13 illustrates an image taken by a camera in a vehicle without any cropping.

FIGS. 13-16 illustrate differences between conventional image cropping techniques and the above-described image cropping techniques of the present invention. FIG. 13 illustrates an image taken by a camera in a vehicle without any cropping. As shown in this image, the bonnet and mirrors of a bus are visible with the camera, along with a pedestrian who is partially blocked by one of the mirrors and vehicles in a parking lot in the background of the image.

Figure 14:
FIG. 14 illustrates conventional vertical cropping of the image of FIG. 13.
Figure 15:
FIG. 15 illustrate conventional horizontal cropping of the image of FIG. 13.

FIG. 14 illustrates conventional vertical cropping of the image of FIG. 13. As shown in FIG. 14, like FIG. 5, everything in the image below the top of the mirrors is cropped from the image, thereby cropping out all of the pedestrian except for his head. FIG. 15 illustrates conventional horizontal cropping of the image of FIG. 13. As shown in FIG. 15, everything between the mirrors is cropped out of the image, including half of the pedestrian. As shown in FIGS. 14 and 15, the conventional cropping techniques remove more of the image than is desired.

Figure 16:
FIG. 16 illustrates cropping of the image of FIG. 13 based on a freeform field of view mask created and applied to the camera according to an embodiment of the present invention.

In FIG. 16, the image of FIG. 13 is cropped based on a freeform field of view mask created and applied to the camera according to an above-described embodiment of the present invention. In FIG. 16, only the portion of the pedestrian that is already blocked by the mirror is cropped out of the image. FIG. 16 improves on the conventional techniques by only cropping a minimum amount of the image, which increases the field of view and allows for safer operation of the vehicle by making more potential obstacles visible to the system while removing unwanted portions of the vehicle from the field of view.

In another exemplary embodiment of the present invention, a non-transitory computer-readable medium is encoded with a computer program that performs the above-described methods. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

As described above, the present invention has a number of advantages over conventional systems and methods. The advantages of the present invention also include improved object detection due to increasing the camera field of view, taking advantage of lenses with a wider field of view, taking advantage of a 360° view camera to block out an entire vehicle (e.g., when there is a camera mounted on its roof), maximum usage of the camera field of view by only removing the fixed items of the vehicle from the field of view, incurring no impact to camera image processing, improving detection of pedestrians and objects, improving sign detection on the sides of the road, and improving tracking of vehicles closer to the front of a vehicle for following distance alerts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for creating a field of view mask for a camera in a vehicle, comprising:
   capturing, with the camera, an image of a portion of the vehicle in front of a calibration screen;
   applying, by a processor, a blurring filter to the captured image to create a blurred image;
   determining, by the processor, a freeform boundary of a field of view of the camera in the blurred image, wherein the freeform boundary excludes first stationary portions of the vehicle along an outer edge of the field of view and second stationary portions of the vehicle that project inward from the outer edge toward a central portion of the field of view of the camera while including other portions of the image surrounding the first and second stationary portions in the field of view;
   creating, by the processor, the field of view mask based on the freeform boundary; and
   applying, by the processor, the field of view mask to the camera.

2. The method according to claim 1, wherein the calibration screen is a monochrome screen.

3. The method according to claim 1, wherein the calibration screen includes a plurality of calibration screens, and for each calibration screen, an image is captured, and the captured images are stitched together to form a combined image to which the blurring filter is applied.

4. The method according to claim 3, wherein the blurring filter is applied to each of the captured images prior to stitching together the captured images.

5. The method according to claim 3, wherein the blurring filter is applied to the captured images after the captured images are stitched together.

6. The method according to claim 1, wherein the method repeats the applying the blurring filter and the determining the freeform boundary at least once prior to creating the field of view mask.

7. The method according to claim 1, further comprising capturing images from the camera with the field of view mask applied thereto during operation of the vehicle.

8. The method according to claim 1, wherein a plurality of calibration targets are integrated into the calibration screen.

9. The method according to claim 1, wherein the processor determines the freeform boundary by comparing the blurred image with a threshold value.

10. The method according to claim 9, wherein the threshold value represents a ratio between different colors.

11. The method according to claim 9, wherein the threshold value is a threshold green screen value that is between 60% and 80% of a maximum green screen value.

12. The method according to claim 1, wherein the field of view mask is applied to the camera as an alpha channel.

13. The method according to claim 1, wherein the blurring filter is a Gaussian blurring filter.

14. The method according to claim 1, further comprising saving the field of view mask in the camera and in a vehicle-based processor separate from the camera.

15. A system comprising:
   a camera mounted on a vehicle, the camera being adapted to capture an image of a portion of the vehicle in front of a calibration screen;
   a memory; and
   a processor coupled to the memory, the processor comprising:
      logic that applies a blurring filter to the captured image to create a blurred image;
      logic that determines a freeform boundary of a field of view of the camera in the blurred image, wherein the freeform boundary excludes first stationary portions of the vehicle along an outer edge of the field of view and second stationary portions of the vehicle that project inward from the outer edge toward a central portion of the field of view of the camera while including other portions of the image surrounding the first and second stationary portions in the field of view;

logic that creates the field of view mask based on the freeform boundary; and logic that applies the field of view mask to the camera.

16. A non-transitory computer-readable medium storing a program which, when executed on a computer, causes the computer to:

capture, with a camera, an image of a portion of the vehicle in front of a calibration screen;

apply, by a processor, a blurring filter to the captured image to create a blurred image;

determine, by the processor, a freeform boundary of a field of view of the camera in the blurred image, wherein the freeform boundary excludes first stationary portions of the vehicle along an outer edge of the field of view and second stationary portions of the vehicle that project inward from the outer edge toward a central portion of the field of view of the camera while including other portions of the image surrounding the first and second stationary portions in the field of view;

create, by the processor, the field of view mask based on the freeform boundary; and apply, by the processor, the field of view mask to the camera.

17. The non-transitory computer-readable medium according to claim 16, wherein the calibration screen is a monochrome screen.

18. The non-transitory computer-readable medium according to claim 16, wherein the calibration screen includes a plurality of calibration screens, and for each calibration screen, an image is captured, and the captured images are stitched together to form a combined image to which the blurring filter is applied.

19. The non-transitory computer-readable medium according to claim 16, wherein the program repeats the applying the blurring filter and the determining the freeform boundary at least once prior to creating the field of view mask.

20. The non-transitory computer-readable medium according to claim 16, wherein the program causes the computer to capture images from the camera with the field of view mask applied thereto during operation of the vehicle.

21. The non-transitory computer-readable medium according to claim 16, wherein a plurality of calibration targets are integrated into the calibration screen.

22. The non-transitory computer-readable medium according to claim 16, wherein the processor determines the freeform boundary by comparing the blurred image with a threshold value.

23. The non-transitory computer-readable medium according to claim 16, wherein the threshold value represents a ratio between different colors.

24. The non-transitory computer-readable medium according to claim 16, wherein the field of view mask is applied to the camera as an alpha channel.

25. The non-transitory computer-readable medium according to claim 16, wherein the field of view mask is saved in the camera and in a vehicle-based processor separate from the camera.

26. The non-transitory computer-readable medium according to claim 16, wherein the calibration screen includes a plurality of calibration screens, and for each calibration screen, an image is captured, and the captured images are stitched together to form the field of view mask that is applied to the camera.

\* \* \* \* \*